Oct. 25, 1955 J. J. VANDERHOOFT 2,721,893

VIBRATING OR MOVING COLOR LINE SCREEN FOR TELECASTING IN TWO OR THREE COLORS

Filed July 9, 1951 2 Sheets-Sheet 1

INVENTOR.
JOHN J. VANDERHOOFT
BY
John C. McGregor

Oct. 25, 1955 J. J. VANDERHOOFT 2,721,893

VIBRATING OR MOVING COLOR LINE SCREEN FOR TELECASTING IN TWO OR THREE COLORS

Filed July 9, 1951 2 Sheets-Sheet 2

INVENTOR.
JOHN J VANDERHOOFT
BY
John C. McGregor

1

2,721,893

VIBRATING OR MOVING COLOR LINE SCREEN FOR TELECASTING IN TWO OR THREE COLORS

John Jacob Vanderhooft, Jamaica, N. Y.

Application July 9, 1951, Serial No. 235,798

4 Claims. (Cl. 178—5.2)

My invention relates to improvements for telecasting in two or three colors and more particularly to a novel method of color filtering, and a mechanically or electrically operated vibrating or moving transparent color line screen.

In color television the colors are produced by a series of color filtering steps pertaining to both the transmitting and receiving operations. With triple objective lens transmission each lens uses a different color filter; that is a red, a blue and a green filter.

Triple objective lens transmission has the objectionable features in that there is the presence of stereoscopic difference in the images as seen from slightly different angles, thus there cannot be a perfect register when the three images are superimposed to form a composite color picture. Another method of color transmission is the single objective lens method which uses a rotating color disk with red, blue and green color filters. A similar large disk or color filter drum is used for receiving, there is no stereoscopic difference present in the images obtained with a single objective lens when the composite color picture is completed.

The objectionable features of the single lens transmission method lie in the fact that the color disk or color drum for receiving the picture are bulky and limited as to picture size and incompatible for 525 scanning line black and white telecasting.

I have discovered that by using a vibrating color line screen composed of red, blue and green transparent color lines in connection with the single lens method of transmission these objectionable features are eliminated.

My invention comprises six elements, (1) a transparent color line screen, composed of red, blue and green transparent color lines; (2) a frame for said color line screen having iron core strips fastened to one side; (3) an adjustable circuit breaker attached to said frame; (4) a flexible or spring cushion; (5) one or more magnetic coils; (6) a housing to serve as an overall covering for the elements, having two tracks on which color screen moves.

The transparent color line screen is composed of orderly spaced red, blue and green transparent lines, lines are of equal width and patterned in the order of red, blue, green, red, blue, green over the entire width of the screen.

For example if there are 210 color lines per linear inch, each linear inch will contain 70 red, 70 blue and 70 green color lines arranged in the above mentioned order.

In stationary position each individual color covers ⅓ of the entire picture frame. By moving the color line screen one color line width ⅔ of the entire picture frame is color filtered by each individual color; thus by moving the color line screen two color line widths the entire picture frame is color filtered by red, blue and green.

At the rate of 210 lines per linear inch the displacement of the screen is $2/210$ or $1/105$ inch.

To impart the necessary motion to the screen one may employ an electric motor having an off centre arrangement on the shaft, or one or more magnetic coils, or any other force or form capable of producing the necessary displacement at the desired speed.

2

For transmission the vibrating color screen is positioned between the camera lens and the mosaic of the camera tube.

For receiving a similar large vibrating color line screen is positioned in front of the picture tube between the fluorescent screen and the observer's eyes.

Both the transmitting and receiving color line screens operate in perfect synchronization so that when a certain part of the image on the camera tube mosaic is red, blue or green filtered that same part showing on the fluorescent screen of the receiving tube is also red, blue and green filtered.

When two colors are used instead of three the color lines of a color line screen consist of alternate orange-red and blue-green transparent lines and the displacement of the screen is one line width instead of two line widths.

Other objects, advantages and capabilities are comprehended by the invention as will more fully appear and as are inherently possessed thereby.

Figure 1:
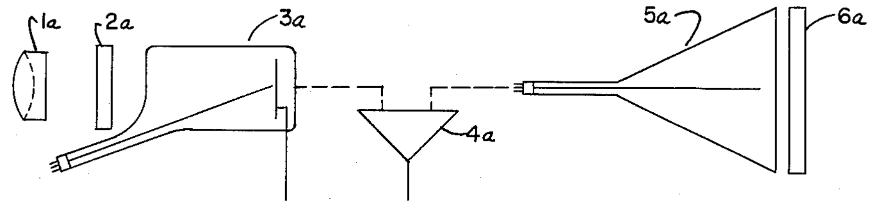
Fig. 1 is a plan view showing the positions of the vibrating color line screens in connection with transmitting and receiving color telecasts.
Figure 2:
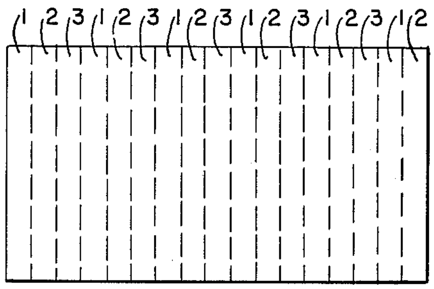
Fig. 2 is a plan view showing the pattern of color lines of a composite color line screen.
Figure 3:
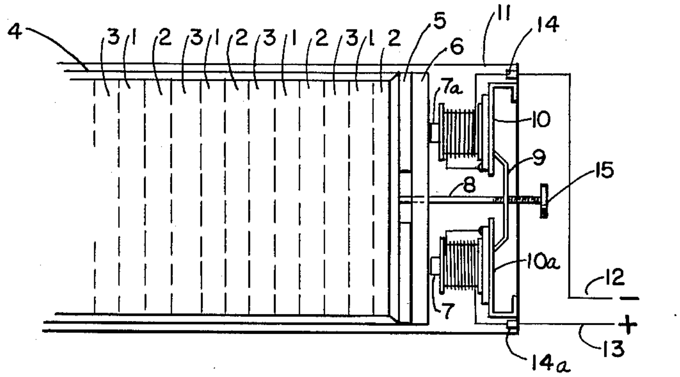
Fig. 3 is a plan view showing a form of magnetic operation to produce the necessary displacement to the color line screen.

In the embodiment shown in Figs. 1 to 4 the color line screen Fig. 2 is composed of transparent color lines No. 1 red, No. 2 blue, No. 3 green; this screen is mounted in a frame No. 4, Fig. 3. One or more iron core strips Nos. 5, Fig. 3, are attached to one side of the frame; the frame No. 4 containing the color line screen is the only moveable part of a color line screen.

Figure 4:
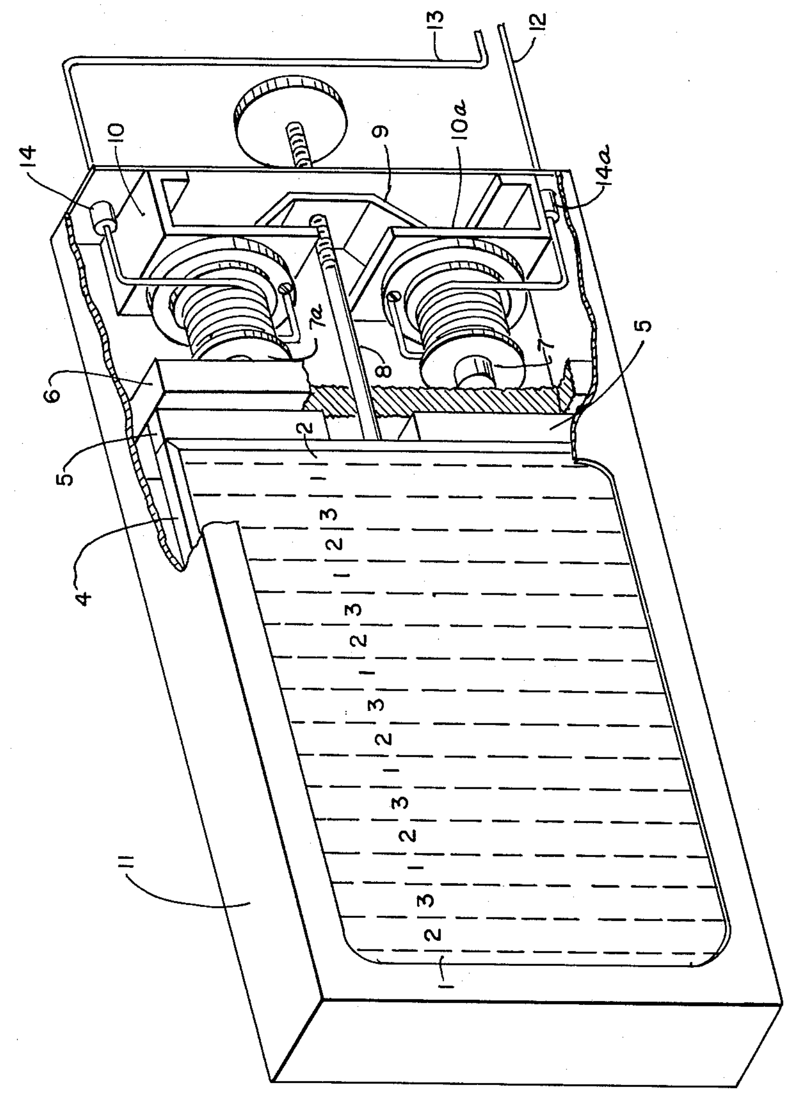
Fig. 4 is a perspective view of an assembled color line screen mounted in housing.

Color line screen, Fig. 2, mounted in frame 4 is placed in housing 11, Figs. 3 and 4, on a track or slide for easy movement. A spring cushion 6 of soft rubber or other flexible material is positioned against the iron core strips Nos. 5 of frame 4 and is placed in stationary position within housing 11. Magnetic coils 7 and 7*a* are placed on the other side of flexible cushion 6, the coils 7 and 7*a* are mounted on brackets 10 and 10*a* these brackets are of conducting material and are insulated from the coils so that no current can pass from coils 7 and 7*a* to brackets 10 and 10*a* except through specified terminals, the brackets are also insulated from housing 11 and are so positioned as to leave an opening or gap in the centre through which non-conducting stem 8 extends. The circuit breaker 9 is placed in contact with brackets 10 and 10*a*. When current flows through supply line 12 and 13 the magnetic force of coils 7 and 7*a* pulls color line screen 4 forward this movement opens up circuit breaker 9 which in turn is pulled back to its former position by the action of flexible cushion 6, thus a continuous vibrating motion exists when the current is turned on. No. 15 is control knob which is located outside housing 11 to permit adjustments so that perfect synchronization may be obtained between color line screens 2*a*, Fig. 1, and 6*a*, Fig. 1, Nos. 14 and 14*a* are insulators.

Fig. 1, No. 1*a* is objective lens of television camera, 3*a* camera picture tube, 4*a* transmitter and 5*a* receiver picture tube.

Having thus described my invention I claim and desire to secure by Letters Patent:

1. In a color television system a color filter comprising, a vibrating moving line screen mounted in a frame, magnetic material attached to one side of said frame, means to apply a magnetic force to move said color line screen from one position to another and resilient means connected to said frame and adapted to return said screen to said one position.

2. In a color television system, a color filter comprising a vibrating color line screen mounted in a frame, magnetic material attached to one side frame, means to apply a magnetic force to move said frame including circuit breaker means connected and adapted to break the energizing circuit when said frame is moved and resilient means connected to said frame and adapted to return said screen to said one position.

3. In a color television system, a color filter comprising a vibrating moving color line screen mounted in a frame having one or more magnetic strips attached to one side, means to energize said strips including a centrally located adjustable circuit breaker; said strips being adapted to rest against a flexible spring cushion, which becomes compressed when the frame is pulled forward by magnetic force, whereby when the magnetic force is broken by the opening up of the circuit breaker it returns the frame to its former position and at the same time closes the circuit to start a new movement.

4. In a color television system a color filter comprising, a moveable color line screen mounted in a magnetic frame, a pair of coils adapted to apply a magnetic force to move said frame, a circuit breaker connecting said coils and adapted to break said circuit when said frame moves whereby said frame oscillates and resilient means connected to said frame and adapted to return said screen to said one position.

References Cited in the file of this patent

UNITED STATES PATENTS

| | | |
|---|---|---|
| 2,389,979 | Huffnagle | Nov. 27, 1945 |
| 2,452,293 | De Forest | Oct. 26, 1948 |
| 2,457,415 | Sziklai | Dec. 28, 1948 |
| 2,479,517 | Schensted | Aug. 16, 1949 |
| 2,528,510 | Goldmark | Nov. 7, 1950 |
| 2,538,071 | Young | Jan. 16, 1951 |
| 2,617,875 | De Forest | Nov. 11, 1952 |